United States Patent [19]

Schmitz

[11] Patent Number: 4,474,212

[45] Date of Patent: Oct. 2, 1984

[54] PROPORTIONAL FLOW CONTROL VALVE

[75] Inventor: Charles J. Schmitz, Rolling Meadows, Ill.

[73] Assignee: Harper-Wyman Company, Hinsdale, Ill.

[21] Appl. No.: 262,181

[22] Filed: May 11, 1981

[51] Int. Cl.³ .............................................. F16K 11/18
[52] U.S. Cl. ............................. 137/614.11; 137/625.3; 251/131; 251/137; 251/138; 251/DIG. 2
[58] Field of Search ............... 137/613, 614.11, 625.28, 137/625.3, 601; 251/129, 138, 139, 141, 137, DIG. 2, 131

[56] References Cited

U.S. PATENT DOCUMENTS

| | | | |
|---|---|---|---|
| 2,587,356 | 2/1952 | McPherson | 137/613 |
| 2,741,266 | 4/1956 | Grayson | 137/614.11 |
| 2,850,258 | 9/1958 | Lazich | 251/138 |
| 2,876,786 | 3/1959 | Hilgert | 251/138 |
| 3,143,131 | 8/1964 | Spencer | 251/138 |
| 3,190,608 | 6/1965 | Hassa | 251/121 |
| 3,244,397 | 4/1966 | Fattor | 251/138 |
| 3,589,672 | 6/1971 | Hoolomon | 251/137 |
| 3,683,962 | 8/1972 | Good | 251/138 |
| 3,789,876 | 2/1974 | Kempton et al. | 137/554 |
| 3,796,229 | 3/1974 | Wright | 137/495 |
| 3,951,168 | 4/1976 | Roberts | 137/625.28 |
| 4,114,852 | 9/1978 | Fournier | 251/138 |
| 4,250,924 | 2/1981 | Sakakibara et al. | 251/138 |
| 4,268,009 | 5/1981 | Allen, Jr. | 251/138 |

Primary Examiner—A. Michael Chambers
Attorney, Agent, or Firm—Mason, Kolehmainen, Rathburn & Wyss

[57] ABSTRACT

A proportional flow control valve includes an electromagnetic actuator which controls the displacement of an elongate member such as a leaf spring with respect to two or more fluid conveying apertures aligned with the member to achieve a fluid flow proportional to the current applied to the actuator. One portion of the member is displaced with respect to another portion of the member by the electromagnetic actuator in order to selectively open an outlet aperture and one or more of the inlet apertures occluded by the member, achieving a desired fluid flow. A firm-off stopper for occluding the output aperture may be attached near the point of connection between the actuator and the member to assure that the flow through the valve is completely terminated when the valve is in the "off" position. The member may be fixed at one end or it may be free at two ends with a selectively positionable intermediate weight arranged to adjust the rate of displacement of the ends of the member with respect to the apertures. In one embodiment, a tapered variable flow valve stem, attached to the member between the stopper and the pivot point of the member, is arranged to variably occlude an inlet aperture according to the position of the member.

22 Claims, 9 Drawing Figures

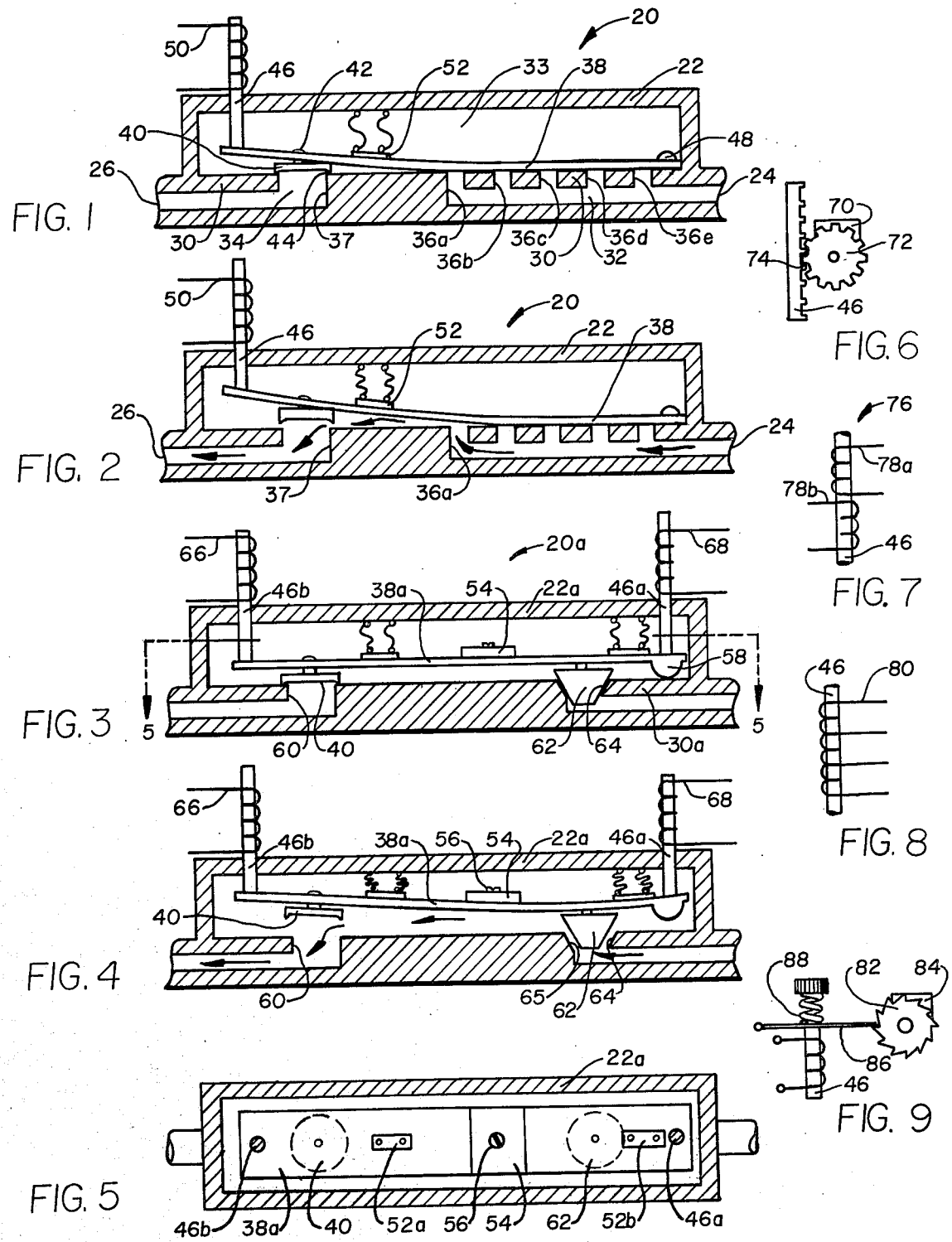

PROPORTIONAL FLOW CONTROL VALVE

BACKGROUND OF THE INVENTION

1. Field of the Invention

This invention relates generally to flow control valves in which the flow through the valve is generally proportional to the signal applied to the valve actuator.

2. Description of the Background Art

In the past a wide variety of valves have been developed in which the flow through the valve is controlled proportionally to the current through an actuator such as an electromagnetic type actuator. For example, the following U.S. patents disclose various means for controlling the flow of a fluid in proportion to the applied current or voltage; U.S. Pat. Nos. 3,054,426, 3,172,021, 3,423,020, 3,435,395, 3,571,769, 4,132,384, 4,150,351, and 4,170,339.

In. U.S. Pat. No. 3,054,426 to Fritz et al, a variable flow valve and a separate shut-off valve are disclosed for control of a gas furnace. Fattor in U.S. Pat. No. 3,244,397 teaches the use of a tapered valve that achieves firm shut off by an extra actuator that forces the valve firmly into its seat.

In addition a number of prior fluid flow control valves have used electromagnetically operated flaps to control the fluid flow. For example, the following U.S. patents disclose valves of this general type: U.S. Pat. Nos. 3,176,516, 3,645,495, 3,968,898, 4,089,348, and 4,114,852.

While prior structures have succeeded to various degrees in providing a low cost, dependable and effective electromagnetically operated proportional flow control valve, there is a continuing need for new and improved devices of this type.

SUMMARY OF THE INVENTION

It is an object of the present invention to provide a simple, dependable fluid flow control device which controls the flow of fluid proportionally to the current applied to the device.

It is still another object of the present invention to provide such a device which can be produced at low cost.

It is still another object of the present invention to provide a device of the class described which is capable of precise selective control of the fluid flow volume.

It is still another object of the present invention to provide such a device which is capable of firmly operating the flow "off" when desired without requiring a separate valve or an additional valve actuator.

It is still another object of the present invention to provide a device of the class described which is capable of efficiently and economically overcoming many of the disadvantages existing in the prior art structures.

These and many other objects and advantages of the present invention are achieved by a proportional fluid flow control valve that includes a housing with a fluid inlet and a fluid outlet. A member is mounted within the housing for pivoting movement around a pivot point. A stopper means, attached to the member and aligned with the outlet, firmly shuts the flow through the outlet off upon contact with the housing. A variable flow valve means attached to the member between the stopper means and the pivot point of the member and aligned with the inlet variably controls the flow through the outlet in accordance with the position of the member. An operator means operatively connected to the member proportionally converts an electrical input signal into a mechanical displacement of the free end of the member with respect to its pivot point.

BRIEF DESCRIPTION OF THE DRAWING

FIG. 1 is a cross-sectional view of one embodiment of the present invention;

FIG. 2 is a cross-sectional view of the embodiment of the present invention shown in FIG. 1, in a different operative position;

FIG. 3 is a cross-sectional view of another embodiment of the present invention;

FIG. 4 is a cross-sectional view of the embodiment of the present invention shown in FIG. 3, in a different operative position;

FIG. 5 is a cross-sectional view taken generally along the line 5—5 in FIG. 3; and FIGS. 6 through 9 schematically shows various electromagnetic actuators useful in implementing the embodiments shown in FIGS. 1 through 5.

DETAILED DESCRIPTION OF THE PREFERRED EMBODIMENT

Referring to the drawing where like reference characters are used for like parts throughout, a proportional control valve 20, shown in FIG. 1, includes a housing 22 with an inlet port 24 and an outlet port 26. While the valve 20 is suitable for controlling any fluid, it is particularly useful in controlling the flow of natural gas in a gas operated oven or range. An intermediate wall 30 divides the housing 22 into an inlet chamber 32, an intermediate chamber 33, and an outlet chamber 34. A plurality of apertures 36 extend through the intermediate wall 30 so as to be communicable between the intermediate chamber 33 and the inlet 24 while an aperture 37 communicates between the chamber 33 and the outlet 26.

The extent that each aperture 36 establishes a path of fluid communication between the inlet chamber 32 and the outlet chamber 34 through the aperture 37 is controlled by a pivotal arm 38, preferably a resilient leaf spring. Each of the apertures 36, 37 is conveniently arranged in a line along the length of the arm 38 with the apertures 36 spaced uniformly along one end of the arm 38 and having approximately the same diameter while the aperture 37 is generally larger than the apertures 36 and is located closest to the opposite end of the arm 38. The arm 38 has sufficient width to occlude each of the apertures 36, 37 and sufficient length to occlude the entire line of apertures 36, 37. If necessary the arm 38, which is conveniently made of blue spring steel, may have its lower surface coated with a substance with good sealing properties such as rubber or the like.

Preferably a firm-off stopper 40 depends downwardly from the arm 36 to occlude the aperture 37 when the arm is in its downward position shown in FIG. 1. The firm-off stopper 40 is conveniently mounted on the arm 38 in a horizontal configuration using a pin 42. The lower surface of the firm-off stopper 40 is preferably made of a substance known for its sealing properties such as rubber or the like and the peripheral edge of the lower surface, which may be circular, includes a sealing flap 44 which ensures that a good seal is quickly established and maintained between the intermediate wall 30 and the stopper 40 in its closed position.

One end of the arm 38 is attached to a vertically extending armature 46 while the other end of the arm 38 is fixed by a screw 48. The armature 46 extends slidably into a solenoid 50, preferably of the type which produces a displacement of the armature generally in proportion to the magnitude of the current applied to the solenoid coil. The armature 46 also extends sealingly through the housing 22 to adjust the position of the free end of the arm 38 with respect to the apertures 36, 37 in accordance with the applied current to the solenoid 50.

Thus, depending on the amount of current to the solenoid the aperture 37 and one or more of the apertures 36 can be selectively opened or closed in a successive fashion. For example, when the solenoid 50 actuates the armature 46 upwardly initially opening the aperture 37 and subsequently opening the aperture 36a an immediate fluid flow from the inlet 24 to the outlet 26 is established, as indicated by the arrows in FIG. 2. If desired, an aperture 36 may only be partially opened and in any case the flow of fluid through the apertures 36 is affected by the distance of the arm 38 from the apertures 36. Thus, as the arm 38 moves upwardly, at least initially, the flow of fluid through an open aperture increases as the arm 38 continues to move further away from the previously opened aperture 36. The flow commencing upon opening of the aperture 36a may be subsequently augmented by the flow through the aperture 36b, if desired, by continuing the upward movement of the armature 46 causing the arm 38 to deflect generally in a curved arc upwardly from the wall 30 in response to the displacement of its free end. Obviously, successive apertures 36c–e may be opened one after another or the already opened apertures 36 may be successively closed in reverse order.

Thus, the device 20 provides a precisely controllable fluid flow without producing inefficient fluid surges which could be destructive to downstream components, by selectively providing a controlled, fluid flow which gently increases in discrete increments. Similarly, upon valve closure the flow of fluid is gently decreased until the stopper 40 comes in contact with the wall 30, immediately and totally cutting off fluid flow. The distance between the aperture 36a and the aperture 37 permits the fluid admitted by the aperture 36a just before its closure to substantially exhaust through the aperture 37 before its closure by the stopper 40.

Optionally one or more position sensors 52 may either be attached to the arm 38 or armature 46 or located in a position adjacent thereto, to sense the position of the arm 38 and to provide this information to a remote controller (not shown). The operation of the sensor 52 ensures that the arm 38 is precisely located in the desired position and if this is not the case provides the feedback information which enables the controller to more precisely locate the arm 38, for example, by control of the current to the solenoid 50. The sensor 52 may take the form of any conventional position sensor including that of a simple mercury level switch. Alternatively, flow sensors can be located in the outlet to provide flow feed back information for controlling the armature 46.

Referring now to FIGS. 3 through 5, a proportional control valve 20a uses two solenoids 66 and 68 and an intermediate adjustably positionable weight 54 to control the deflection of the pivotal arm 38a, which is also preferably a resilient leaf spring but may be rigid, if desired. Referring to FIG. 3, the arm 38a is mounted within a housing 22a for pivotal movement around a fulcrum 58, conveniently attached to one end of the arm 38a and resting removably on the wall 30a. A stopper 40, described previously, depends downwardly from the end of the arm 38a opposite the end including the fulcrum 58 to occlude the aperture 60. A variable flow valve stem 62, conveniently of a frusto-conical shape, is located between the member 40 and the fulcrum 58, depending downwardly and tapered to variably adjust the flow through the aperture 64 according to the displacement of the arm 38a. Preferably, the wall 65 of the aperture 64 is also tapered to receive the stem 62.

The solenoid 66 receives the armature 46b that is secured to the end of the arm 38a closest to the stopper 40 while an additional solenoid 68 receives the armature 46a secured to the other end of the arm 38a. In one preferred embodiment, the solenoid 66 is a conventional, inexpensive, single acting solenoid while the solenoid 68 is preferably double-acting and capable of very accurately controlled up or down movement proportional to the magnitude of the applied current. In another preferred embodiment, both solenoids are double-acting and are capable of producing a displacement proportional to the applied current.

Conveniently, the solenoid 66 controls the opening and closing of the stopper 40 and the stem 62, with the solenoid 68 merely enabling fine adjustment of the position of the stem 62. Thus, as indicated by the arrows in FIG. 4, upon actuation of the solenoid 66, a fluid flow path is established between the apertures 60 and 64 with the solenoid 68 being actuated upwardly to slightly increase the flow. Alternatively, only one solenoid is used with the arm 38a, preferably associated with the armature 46a and producing a displacement proportional to the applied current.

The adjustably positionable weight 54 is located along the length of the arm 38a in any desired position using the screw 56 to secure it on the upper surface of the arm 38a. The position of the weight 54 controls the curvature of the arm 38a which results upon actuation of either solenoid 66 or 68. For example, moving the weight 54 closer to the armature 46b decreases the deflection of the arm 38a for a given displacement of the armature 46b and results in less opening of the aperture 64 in response to actuation of the solenoid 66 than would otherwise have resulted if the weight was located closer to the armature 46a. Thus, even when only one solenoid is used, the weight 54 enables calibration of the arm's response to displacement by one or more solenoids.

When digital pulses are applied to the solenoid, for example, using a pulse width modulated signal, the arm 38a or 38 may tends to chatter without the weight 54. The weight 54 provides sufficient inertia, at the correct location to damp any vibrations developed in the arm due to the inability of the arm to follow the displacements resulting from the rapidly varying control signals. Thus, the weight 54, useful with the embodiment of FIGS. 1 and 2 as well, in effect serves as a mechanical integrator to produce a linear arm response to a rapidly varying digital signal.

When both ends of the arm 38a are displaced, as shown in FIGs. 3–5, it may be desirable to include a position sensor 52a adjacent the armature 46b on or in proximity to the arm 38a in addition to the sensor 52. Thus, feedback from the sensors 52 and 52a can be used to adjust the position of either the armature 46b or the armature 46a making possible very fine flow control.

While any conventional solenoid can be used in the practice of the present invention, it is preferred that at least one solenoid associated with each valve operate to displace its armature in an amount proportional to the applied current. A variety of single coil solenoids which achieve a displacement proportional to the applied current are known in the art. For example, U.S. Pat. Nos. 3,725,747 and 4,170,339 disclose such solenoids and are hereby expressly incorporated by reference herein in full.

Other electromagnetically operated controls for producing a displacement proportional to the applied current are illustrated in FIGS. 6 through 9. In FIG. 6 a motor 70 rotates a pinion 72 in engagement with a rack gear 74 to adjust the vertical position of the armature 46. Another motor controlled electromagnetic actuator which produces a displacement proportional to the applied current is disclosed in U.S. Pat. No. 3,054,426 which is hereby incorporated herein by reference in full.

Referring to FIG. 7, an opposed coil solenoid 76 is illustrated. The opposed coils 78a and 78b are operative to produce movement of the armature 46 in either direction in a controlled amount in proportion to the strength of the signal applied to the coils. Such solenoids are described in U.S. Pat. Nos. 4,097,833, 3,900,822, 3,244,397, and 3,154,729 hereby incorporated by reference herein in full.

In still another preferred embodiment, a tapped coil 80 shown in FIG. 8 may be utilized to provide precise control over the position of the armature with respect to the solenoid windings. The various taps are effective to alter the center of the magnetic field thus controlling the position of the armature. Such a tapped coil solenoid is described in U.S. Pat. Nos. 3,190,608 and 3,244,397 hereby expressly incorporated by reference herein in full.

Referring to FIG. 9, a reversible step motor controller includes a stepper gear 82 rotated by a step motor 84 to vary the position of the hinged arm 86 upon which the armature 46 is transversely mounted. The arm 86 is biased against the teeth of the stepper gear 82 by a spring 88. Conventionally a separate stepper gear (not shown) may be used for reversing the direction of armature displacement, using either a separate stepper motor or a single reversible stepper motor.

While a limited number of embodiments of the present invention have been described, it will be apparent that various changes and modifications thereof will occur to those skilled in the art. For example, various nonelectromagnetic devices, such as a conventional bimetallic element, can be used to displace the arm in an amount proportional to the applied signal. In addition the various embodiments may be used without the stopper 40 if preferred. It is intended in the appended claims to cover all such changes and modifications as fall within the true spirit and scope of the present invention.

What is claimed and desired to be secured by Letters Patent of the United States is:

1. A proportional fluid flow control valve comprising:
    a housing with first and second fluid port means communicable with one another;
    a member mounted within said housing for pivoting movement around a pivot point;
    a closure means attached to said member and aligned with the first port means for shutting the flow through said first port means on and off in accordance with the position of said member;
    a variable flow valve means attached to said member and aligned with said second port means for variably controlling the flow through said second port means in accordance with the position of said member when said closure means is also open to fluid flow; and
    an operator means operatively connected to said member for proportionally converting an electrical input signal into a mechanical displacement of the free end of said member with respect to its pivot point.

2. The valve of claim 1 wherein said variable flow valve means includes a tapered valve member slidable within said second port means.

3. The valve of claim 1 wherein said member is resilient and is aligned to variably occlude said second port means in accordance with extent of displacement of its free end.

4. The valve of claim 3 wherein said second port means includes a plurality of apertures aligned with said member and said first port means, said first port means and said apertures spaced along the length of said member so as to be occluded by said member.

5. The valve of claim 1 wherein said member includes two pivotal ends, said operator means including an actuator associated with each end of said member.

6. The valve of claim 5 including a weight adjustably positionable along the length of said member between said ends.

7. The valve of claim 1 wherein said member is a leaf spring.

8. The valve of claim 1 wherein said operator means is an electromagnetic device.

9. The valve of claim 8 wherein said operator means includes a pair of electromagnetic actuators, one positioned adjacent each end of said spring.

10. The valve of claim 8 wherein said electromagnetic operator means includes a motor and a gear train connected between said motor and said member.

11. The valve of claim 8 wherein said electromagnetic operator means includes an opposed coil solenoid.

12. The valve of claim 8 wherein said electromagnetic operator means includes a tapped coil solenoid.

13. The valve of claim 1 including feedback means for sensing the position of said member and for producing an electrical signal representative of the position of said member useful in controlling the movement of said member to achieve a desired fluid flow.

14. The valve of claim 1 wherein said variable flow valve means includes means for varying the fluid flow in discrete increments.

15. The valve of claim 1 wherein said closure means includes a firm-off stopper.

16. The valve of claim 15 wherein said stopper includes a sealing flap that surrounds said first port means.

17. The valve of claim 1 wherein said variable flow valve means is located between the closure means and the pivot point of said member.

18. The valve of claim 16 wherein said first port means is a fluid outlet from said housing and said second port means is a fluid inlet to said housing.

19. A proportional fluid flow control valve comprising:
    a housing with a fluid inlet and a fluid outlet;
    a flexible member mounted within said housing for pivoting movement around a pivot point;

at least three apertures in said housing communicable with said inlet and said outlet and aligned along the length of said member;

an operator means operatively connected to said member for proportionally converting an electrical input signal into a pivotal displacement of said member from a position occluding said apertures to a position spaced from at least one of said apertures; and a firm-off stopper attached to said member and arranged to close off one of said apertures, said stopper being attached to said member near its free end, said aperture that is arranged to be occluded by said stopper being a fluid outlet.

20. The valve of claim 19 wherein said member is a resilient leaf spring.

21. The valve of claim 20 including means for integrating the displacement applied by said operator means.

22. The valve of claim 21 wherein said integrating means includes an adjustably positionable weight.

* * * * *